US012779703B2

(12) United States Patent
Onodera

(10) Patent No.: US 12,779,703 B2
(45) Date of Patent: Nov. 3, 2026

(54) WORKPIECE HOLDING DEVICE

(71) Applicant: CREATIVE TECHNOLOGY CORPORATION, Kawasaki (JP)

(72) Inventor: Hiromitsu Onodera, Kawasaki (JP)

(73) Assignee: CREATIVE TECHNOLOGY CORPORATION, Kawasaki (JP)

( * ) Notice: Subject to any disclaimer, the term of this patent is extended or adjusted under 35 U.S.C. 154(b) by 104 days.

(21) Appl. No.: 18/864,136

(22) PCT Filed: Jun. 14, 2023

(86) PCT No.: PCT/JP2023/022156
§ 371 (c)(1),
(2) Date: Nov. 8, 2024

(87) PCT Pub. No.: WO2023/243674
PCT Pub. Date: Dec. 21, 2023

(65) Prior Publication Data
US 2026/0183971 A1 Jul. 2, 2026

(30) Foreign Application Priority Data
Jun. 17, 2022 (JP) ................................ 2022-097993

(51) Int. Cl.
*B65G 47/90* (2006.01)
*B25J 15/00* (2006.01)

(52) U.S. Cl.
CPC .................................. *B25J 15/008* (2013.01)

(58) Field of Classification Search
CPC ...... B25J 15/0057; B25J 15/008; B65G 47/90
(Continued)

(56) References Cited

U.S. PATENT DOCUMENTS 7,401,390 B2 * 7/2008 Kumazawa ............. F26B 13/12 26/93
9,061,422 B2 * 6/2015 Ruschulte ................ B25J 15/00
(Continued)

FOREIGN PATENT DOCUMENTS

EP 3128543 B1 * 9/2018 ......... B81C 1/00269
JP 2-190287 A 7/1990
(Continued)

OTHER PUBLICATIONS

US 2024/0328180 A1, Pickering, Oct. 3, 2024.*
(Continued)

*Primary Examiner* — Douglas A Hess
(74) *Attorney, Agent, or Firm* — Birch, Stewart, Kolasch & Birch, LLP

(57) ABSTRACT

Provided is a workpiece holding device capable of holding a workpiece with a sufficient adhesive force and separating the held workpiece without applying a load thereto. The device includes: a flexible base material including an adhesive holding part; a movement roller; and a load receiving plate that supports the base material that holds a workpiece on the adhesive holding part, where the strip-like base material is wound around a roll surface of the movement roller with the adhesive holding part facing outward, wherein (I) the adhesive holding part an adhesive holding surface, (II) the adhesive holding part is curved along the roll surface of the movement roller to enable the workpiece to be peeled off, and when the workpiece is held on the adhesive holding surface, bending of the base material due to a weight of the workpiece can be prevented by the load receiving plate.

6 Claims, 11 Drawing Sheets

(58) Field of Classification Search
USPC ........................................ 198/803.3; 294/212
See application file for complete search history.

(56) References Cited

U.S. PATENT DOCUMENTS

| | | | | |
|---|---|---|---|---|
| 10,160,014 | B2 * | 12/2018 | Kobayashi ............ | B08B 7/0028 |
| 11,357,145 | B2 * | 6/2022 | Liu .................... | H05K 13/0404 |
| 11,398,639 | B2 * | 7/2022 | Bettey ................. | H01M 8/0297 |
| 2014/0010628 | A1 | 1/2014 | Ruschulte et al. | |

FOREIGN PATENT DOCUMENTS

| | | | | |
|---|---|---|---|---|
| JP | 2001-85896 | A | 3/2001 | |
| JP | 2014-509953 | A | 4/2014 | |
| JP | 2014-162571 | A | 9/2014 | |
| JP | 2018-176289 | A | 11/2018 | |
| WO | WO-2018110677 | A1 * | 6/2018 | .......... B25J 15/0293 |
| WO | WO-2022006635 | A1 * | 1/2022 | ............. E04G 21/20 |

OTHER PUBLICATIONS

International Search Report for PCT/JP2023/022156 mailed on Aug. 22, 2023.
Written Opinion of the International Searching Authority for PCT/JP2023/022156 mailed on Aug. 22, 2023.

* cited by examiner

WORKPIECE HOLDING DEVICE

TECHNICAL FIELD

This invention relates to a workpiece holding device using an adhesive holding material that is self-adhesive, and specifically to a workpiece holding device capable of holding even a relatively heavy workpiece and removing the held workpiece without applying any load to it.

BACKGROUND ART

In occasions where various workpieces including semiconductor wafers and glass substrates are transported or picked up, a vacuum chuck that holds a workpiece by vacuum suction or an electrostatic chuck that holds a workpiece by electrostatic attraction force are used.

However, the vacuum chuck cannot be used in a decompression device and could leave vacuum traces on a thin, breakable workpiece or occasionally break the workpiece. Meanwhile, the electrostatic chuck could occasionally fail to hold the workpiece of certain materials or require a high voltage to increase the attraction force. Therefore, as an alternative to these, various versatile methods for any type of workpiece that are less subject to facility restrictions have been considered.

For example, a device has been proposed in which an unused adhesive tape having a high adhesive force is constantly supplied while an adhesive tape having adhesiveness that is wound around a supply roll is reeled on a take-up roll, and with the use of the two adhesive tapes, a workpiece is caused to adhesively adhere to and to thereby be held on the adhesive surfaces of the two adhesive tapes, and then, a pressing pin is pressed from above into a gap between the two adhesive tapes to push out the held workpiece downward so as to peel off the workpiece (see Patent Literature 1).

Further, an electronic component transporting head has been proposed in which an adhesive surface of an adhesive tape is pressed by a pressing block from above against an electronic component (workpiece) to cause it to adhesively adhere to the adhesive surface, and then, the pressing block is raised while holding the electronic component and at this time, the periphery of the electronic component is brought into contact with a guide member to prevent the electronic component itself from rising so that the electronic component is peeled off (see Patent Literature 2).

In addition, a picking device has been proposed in which while supplying an adhesive tape between a tape holder on a supply side and a tape holder on a recovery side, a workpiece is caused to adhesively adhere to the adhesive tape, and after adhesion of the workpiece, an excitation rotor positioned above the region of adhesion and having an eccentric cam is raised and lowered so that the workpiece is peeled off by shaking (see Patent Literature 3).

Meanwhile, a device has been proposed in which a workpiece is held by a holding means including an adhesive coating layer coated with an adhesive, and then, when the workpiece is released, a plurality of air chambers positioned above the holding means and inflatable with air are expanded to curve the holding means so that the workpiece is separated from the adhesive coating layer (see Patent Literature 4).

Moreover, a workpiece transporting device has been proposed in which an adhesive layer that is self-adhesive is stacked on a surface of an endless belt, which is formed as a belt conveyor using a drive roller and a driven roller so that a workpiece adhesively held on the adhesive layer can be transported (see Patent Literature 5).

CITATION LIST

Patent Literature

[Patent Literature 1]
JP H2-190287 A
[Patent Literature 2]
JP 2001-85896 A
[Patent Literature 3]
JP 2018-176289 A
[Patent Literature 4]
JP 2014-509953 A
[Patent Literature 5]
JP 2014-162571 A

SUMMARY OF INVENTION

Technical Problem

When an adhesive tape having adhesiveness is used to hold a workpiece as described above, a sufficient holding force on the workpiece needs to be exhibited, but at the same time, how to separate the held workpiece is important.

For example, when an adhesive tape in which an adhesive is applied to a base material such as cellophane is used, the holding force (adhesive force) on the workpiece can be enhanced by securing an adhesive surface for the workpiece as much as possible.

However, for peeling it off, various measures are required as described in the aforementioned Patent Literatures 1 to 3, and a large load is exerted on the workpiece in peeling it off.

On the other hand, unlike an adhesive tape to which an adhesive is applied, when a workpiece is adhesively held on an adhesive layer that is self-adhesive as described in Patent Literature 5 or a partially cross-linked silicone resin as listed in Patent Literature 4 (paragraph 0033 of the description) is used, the force required to peel off the workpiece is smaller.

However, as the adhesive force is reduced, the workpiece that can be held is limited accordingly. In particular, depending on the weight of the workpiece, the adhesive holding surface to which the workpiece adhesively adheres could bend or twist, thereby dropping the workpiece. Therefore, there is a trade-off issue between increasing the adhesive holding force on the workpiece and enabling separation with the least load applied to the workpiece.

Thus, the inventors of the present invention have diligently considered means capable of surely holding a workpiece and separating the workpiece without applying a load to it, and as a result, the inventors have found that the aforementioned problems can be resolved by winding, around a movement roller, a flexible strip-like base material to which an adhesive holding material that is self-adhesive is attached such that in holding the workpiece, an adhesive holding part of the strip-like base material to which the adhesive holding material is attached is made to be a flat adhesive holding surface so as to adhesively hold the workpiece while supporting the strip-like base material by a load receiving plate, and in separating the workpiece, the adhesive holding part of the strip-like base material is curved along a roll surface of the movement roller, and have completed the present invention.

Accordingly, an object of the present invention is to provide a workpiece holding device capable of holding a workpiece with a sufficient adhesive force and separating the held workpiece without applying a load to it.

Solution to Problem

More specifically, the present invention is a workpiece holding device using an adhesive holding material that is self-adhesive, the workpiece holding device including: a flexible strip-like base material including an adhesive holding part to which the adhesive holding material is attached; a movement roller including a roll surface; and a load receiving plate that supports from below at least a portion of the strip-like base material that holds a workpiece on the adhesive holding part, in which the strip-like base material is wound around the roll surface of the movement roller with the adhesive holding part facing outward, operation of the movement roller (I) makes the adhesive holding part of the strip-like base material an adhesive holding surface that is flat so as to enable the workpiece to be held and (II) curves the adhesive holding part of the strip-like base material along the roll surface of the movement roller so as to enable the workpiece to be peeled off, and when the workpiece is held on the adhesive holding surface, bending of the strip-like base material due to a weight of the workpiece is prevented by means of the load receiving plate.

Further, in the present invention, it is preferable that in the aforementioned workpiece holding device, an adhesive member having adhesiveness is interposed between the load receiving plate and the strip-like base material.

In the present invention, the strip-like base material is wound around the roll surface of the movement roller, with the adhesive holding part facing outward, which enables holding and separation (peeling off) of the workpiece. Specifically, by moving the movement roller to change the state (shape) of the strip-like base material, (I) the adhesive holding part of the strip-like base material is made to be an adhesive holding surface that is flat so as to enable the workpiece to be held, and (II) the adhesive holding part of the strip-like base material is curved along the roll surface of the movement roller so as to enable the workpiece to be peeled off.

The specific configuration of the device forming such a workpiece holding device is not particularly limited, but preferably, embodiments as follows may be exemplified.

More specifically, as a first embodiment, a workpiece holding device may be included, which has: a flexible strip-like base material (first strip-like base material) including an adhesive holding part to which the adhesive holding material that is self-adhesive is attached; a load receiving plate that supports from below at least a portion of the first strip-like base material that holds a workpiece on the adhesive holding part; an extension device including an extendable rod having, at a tip end of the rod, the movement roller including the roll surface; and a box-shaped housing including a storage chamber in which the first strip-like base material and the extension device are housed, a lower portion of the box-shaped housing being opened, in which the first strip-like base material is wound around the roll surface of the movement roller in the extension device with the adhesive holding part facing outward, with one end of the first strip-like base material being fixed and with the other end of the first strip-like base material being tensibly attached via a tensile elastic member, (i-1) the rod of the extension device is extended to push out the movement roller, thereby making the adhesive holding part of the first strip-like base material the adhesive holding surface that is flat so as to enable the workpiece to be held, (ii-1) the rod of the extension device is contracted to retract the movement roller, thereby curving the adhesive holding part of the first strip-like base material along the roll surface of the movement roller so as to enable the workpiece to be peeled off, and the load receiving plate includes an opening hole for exposing the adhesive holding material when the workpiece is held by the adhesive holding part of the first strip-like base material and closes a lower portion of the box-shaped housing.

The workpiece holding device of the first embodiment uses the extension device having the extendable rod with the movement roller at its tip end. The aforementioned first strip-like base material is wound around the movement roller of the extension device, and these are housed in the storage chamber of the box-shaped housing, with one end of the first strip-like base material being fixed and the other end being tensibly attached via the tensile elastic member. At this time, the first strip-like base material wound around the movement roller is in a state in which the adhesive holding part faces outward and is curved along the roll surface of the movement roller. Further, at this time, the rod of the extension device is kept contracted, and this state is a steady position.

Then, (i-1) the rod of the extension device is extended to push out the movement roller, thereby making the adhesive holding part of the first strip-like base material the adhesive holding surface that is flat so as to be parallel to the direction in which the movement roller is pushed out, so that the workpiece can be held. At this time, the tensile elastic member attached to one end of the first strip-like base material is in a tensioned state. Then, (ii-1) the rod of the extension device is contracted to retract the movement roller so that the relative position between the first strip-like base material and the movement roller becomes the steady position, thereby causing the adhesive holding part of the first strip-like base material to return to the state of being curved along the roll surface of the movement roller, so as to enable the workpiece to be peeled off.

Here, the flexible first strip-like base material may be those in which the adhesive holding part of the strip-like base material can be made to be an adhesive holding surface that is parallel to the direction in which the rod is pushed out or the adhesive holding part of the strip-like base material can be curved along the roll surface of the movement roller, in accordance with the movements of the movement roller as in (i-1) and (ii-1) above. The material is not particularly limited, and for example, a resin base material (resin film), a metal base material, or those made of paper, cloth, or the like may be used.

Further, the adhesive holding material is self-adhesive, which differs from an adhesive tape in which an adhesive is applied to a base material such as cellophane, and the adhesive holding material itself has adhesiveness (is self-adhesive). Therefore, the adhesive tape can no longer be repeatedly used when peeled off from a target object (workpiece) after attachment since the adhesive force with the adhesive is declined, while the adhesive holding material that is self-adhesive can be used to hold and peel off workpieces repeatedly. In that case, further repeated use becomes available by surface cleaning.

Preferable examples of such an adhesive holding material that is self-adhesive may include those made of resin, such as silicone rubber, ethylene-propylene-diene rubber (EPDM), butyl rubber, fluorine resins, urethane resins, and acrylic resins. Among other things, those capable of exhibiting the van der Waals force, which is one type of intermolecular force, at an interface with the workpiece as a target to be adhesively held are preferable.

Furthermore, the tensile elastic member attached to one end of the first strip-like base material is not particularly limited as long as it can receive the tensile load from the first strip-like base material in accordance with the movement of the movement roller in (i-1) above, and the examples may include a tension spring (tension coil spring) and rubber.

Meanwhile, the extension device has an extendable rod with a movement roller at its tip end, and allows the operations in (i-1) and (ii-1) above. In configuring such an extension device, for example, a cylinder device having a piston rod supported in an extendable manner in a cylinder body may be used or a known device such as an electric actuator with a ball screw attached to a stepping motor may be adopted. Further, the movement roller provided in the piston rod or a tip end of a rod such as a ball screw only needs to have a roll surface around which the first strip-like base material is wound, and the movement roller itself may rotate during the operations in (i-1) and (ii-1) above or may slidingly move over the first strip-like base material without rotation.

Further, the load receiving plate supports from below the first strip-like base material that holds a workpiece on the adhesive holding surface. When the workpiece is adhesively held on the adhesive holding surface of the first strip-like base material in the state of (i-1) above, the first strip-like base material bends due to the weight of the workpiece, the degree of which varies depending on the type and size of the workpiece. Therefore, in the workpiece holding device of the first embodiment, a predetermined opening hole is provided so that the adhesive holding material is exposed when holding the workpiece on the adhesive holding surface of the first strip-like base material, and the opened lower portion of the box-shaped housing is closed by the load receiving plate. In this manner, the adhesive holding material forming the adhesive holding surface is caused to project through the opening hole so as to adhesively hold the workpiece and simultaneously, the first strip-like base material is prevented from bending. Note that in the present invention, "below" means a lower side in the vertical direction relative to the ground when the workpiece holding device is installed and "above" means an upper side in the vertical direction.

Further, in the workpiece holding device in the first embodiment, an adhesive member having adhesiveness may be interposed between the load receiving plate and the first strip-like base material. With this, deformation such as bending and distortion of the first strip-like base material when adhesively holding the workpiece on the adhesive holding surface can be suppressed. This adhesive member may be provided on the load receiving plate side or on the first strip-like base material side. Note that for the same reason, instead of providing the adhesive member between the load receiving plate and the first strip-like base material, the first strip-like base material having adhesiveness may be used. In that case also, the first strip-like base material is separately provided with the adhesive holding material to form the adhesive holding part.

Next, as a second embodiment, a workpiece holding device may be included, which has: a flexible second strip-like base material including at least two of the adhesive holding parts, to each of which the adhesive holding material is attached; a movement roller device including two of the movement rollers, the movement rollers having roll surfaces and roller shafts that are capable of parallel movement within a frame body having a guide rail, the roller shafts being supported at both ends of the frame body via tensile elastic members such that the movement rollers are spaced apart from each other within the frame body; a lifting device that is provided upright in the movement roller device, the lifting device having a fixing jig that can be raised and lowered along a lifting axis; and the load receiving plate that supports from below at least the portion of the strip-like base material that holds a workpiece on the adhesive holding parts, in which the second strip-like base material is wound around the roll surfaces of the two movement rollers of the movement roller device with the adhesive holding parts facing outward, with both ends of the second strip-like base material each being fixed to the fixing jig of the lifting device, (i-2) with the two movement rollers of the movement roller device spaced apart from each other, the adhesive holding surface where the two adhesive holding parts are flush with each other is formed so as to enable the workpiece to be held, (ii-2) by raising the fixing jig of the lifting device along the lifting axis, the two movement rollers of the movement roller device are brought closer to each other to curve the two adhesive holding parts along the respective roll surfaces of the movement rollers so as to enable the workpiece to be peeled off, and the load receiving plate includes the opening hole for exposing the adhesive holding material when the workpiece is held by the two adhesive holding parts of the second strip-like base material and closes the lower portion of the frame body.

The workpiece holding device in the second embodiment uses the movement roller device including two movement rollers within the frame body having the guide rail, and the lifting device that is provided upright in the movement roller device and that has the fixing jig that can be raised and lowered along the lifting axis to wind the second strip-like base material around the two movement rollers of the movement roller device. At this time, the second strip-like base material includes at least two adhesive holding parts, to each of which the adhesive holding material is attached, with the adhesive holding parts facing outward, and both ends of the second strip-like base material are each fixed to the fixing jig of the lifting device. Further, in the movement roller device, the roller shafts are supported at both ends of the frame body via the tensile elastic members such that the two movement rollers are spaced apart from each other, and the second strip-like base material wound around these movement rollers forms the adhesive holding surface where the two adhesive holding parts are flush with each other in the area provided by the movement rollers spaced apart from each other, and this state becomes the steady position.

That is, the aforementioned steady position corresponds to the state (i-2) in which with the two movement rollers of the movement roller device spaced apart from each other, the adhesive holding surface where the two adhesive holding parts are flush with each other is formed so as to enable the workpiece to be held. At this time, the fixing jig of the lifting device is lowered to a lower side of the lifting axis. Then, (ii-2) by raising the fixing jig of the lifting device along the lifting axis, the two movement rollers of the movement roller device are brought closer to each other, and accordingly, the two adhesive holding parts of the second strip-like base material curve along the respective roll surfaces of the movement rollers so as to enable the workpiece to be peeled off.

Here, the tensile elastic member used in the movement roller device is not particularly limited as long as it can receive a tensile load due to the tension when the movement rollers are brought closer to each other as the fixing jig in the lifting device is raised, and the examples may include the same as those described in the first embodiment above. Further, the movement roller may be those having the roll surface and the roller shaft and being capable of parallel movement along the guide rail of the frame body. At this time, in the operations (i-2) and (ii-2) above, the movement roller itself may rotate or may slidingly move within the frame body without rotation.

Further, the lifting device is provided upright in the movement roller device, has the fixing jig that can be raised and lowered along the lifting axis, and is capable of performing the operations (i-2) and (ii-2) above. For such a lifting device, similarly to those described in the extension device in the first embodiment above, for example, a cylinder device having a piston rod supported in an extendable manner in a cylinder body may be used or a known device such as an electric actuator with a ball screw attached to a stepping motor may be adopted.

In addition, in the workpiece holding device of the second embodiment, for the flexible second strip-like base material and the adhesive holding material, the same as those described in the first embodiment may be used.

Further, similarly to the case of the first embodiment, the load receiving plate supports from below the second strip-like base material that holds the workpiece on the adhesive holding surface, and is provided with predetermined opening holes so as to expose the adhesive holding materials of at least two adhesive holding parts included when holding the workpiece on the adhesive holding surface of the second strip-like base material, and the opened lower portion of the frame body is closed by the load receiving plate.

Furthermore, also in the workpiece holding device in the second embodiment, for the same reason as that for the case of the first embodiment, an adhesive member having adhesiveness may be interposed between the load receiving plate and the second strip-like base material, and further, instead of providing the adhesive member between the load receiving plate and the second strip-like base material, the second strip-like base material having adhesiveness may be used. In that case, the second strip-like base material is separately provided with the adhesive holding material to form the two adhesive holding parts.

The workpiece to be adhesively held in the workpiece holding device of the present invention is not particularly limited as long as it can be adhesively held by the adhesive holding material that is self-adhesive, and the examples may include those made of various types of materials such as metal material such as aluminum or stainless steel, and resin films, including semiconductor wafers and glass substrates. Further, materials, parts, or the like for use in manufacturing processes can also be adhesively held.

Advantageous Effects of Invention

According to the present invention, a workpiece can be held with sufficient adhesive force, and the held workpiece can be separated without applying a load to it. Therefore, for example, it is possible to hold even a relatively heavy workpiece without dropping it and to separate even a relatively thin, weak workpiece without scratching or damaging it.

Moreover, the workpiece holding device of the present invention adhesively holds the workpiece using the van der Waals force on the surface, and is thus versatile for any type or shape of workpiece and is not subject to any particular facility restrictions. Therefore, the workpiece holding device of the present invention can be used in a wide range of applications, such as a workpiece transporting device that transports various types of workpieces or as part of a robot hand that picks up workpieces.

BRIEF DESCRIPTION OF DRAWINGS

FIG. 1(*a*) is an explanatory perspective view as seen from above; and FIG. 1(*b*) is an explanatory perspective view as seen from below.

FIG. 7(*b*) is (ii-1) a schematic explanatory view showing a state in which the adhesive holding part of the strip-like base material is curved along a roll surface of the movement roller.

DESCRIPTION OF EMBODIMENTS

Hereinafter, the present invention will be specifically described with reference to the drawings. Note that the present invention is not restricted by those contents.

[Workpiece Holding Device X1 According to First Embodiment]

Figure 1A:
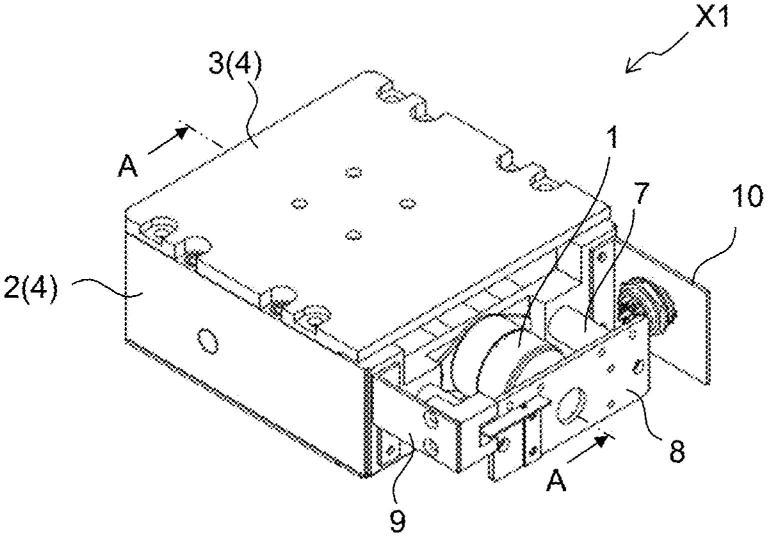
FIG. 1 shows a workpiece holding device X1 according to a first embodiment.
Figure 1B:
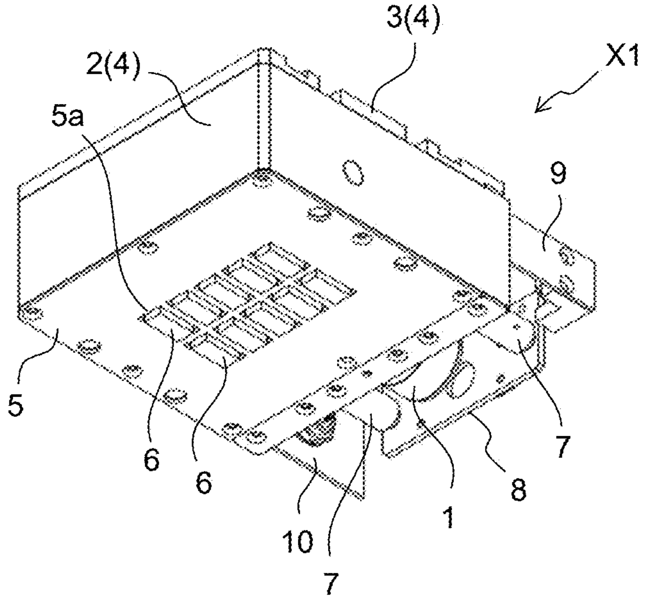

First, regarding a workpiece holding device according to a first embodiment, FIG. 1 shows a workpiece holding device X1 as an example. FIG. 1(*a*) is an explanatory perspective view as seen from above and FIG. 1(*b*) is an explanatory perspective view as seen from below. In the workpiece holding device X1, an extension device 1, which includes a movement roller around which a first strip-like base material is wound with an adhesive holding part facing outward, is housed in a box-shaped housing 4. The box-shaped housing 4 is composed of a housing main body 2 with an upper portion and a lower portion each being opened and a lid body 3 that closes the upper portion, and these form a storage chamber in which the extension device 1 and the first strip-like base material are housed. Further, the lower portion of the housing main body 2 is closed by a load receiving plate 5 made of stainless steel with a thickness of 1 mm having an opening hole 5*a* so as to expose an adhesive holding material 6 that is self-adhesive with a thickness of 2 mm that is attached to the first strip-like base material described later.

Further, in the workpiece holding device X1, a support plate 8 is attached to an end portion of a ball guide (linear guide) 7 that assists the extension and contraction of a rod of the extension device 1. Furthermore, a sensor that identifies an original position of the aforementioned rod is attached to the box-shaped housing 4 by means of a mounting jig 9, and connectors for power and signal supply for the aforementioned sensor and a stepping motor described later are further attached via a mounting bracket 10.

Figure 2:
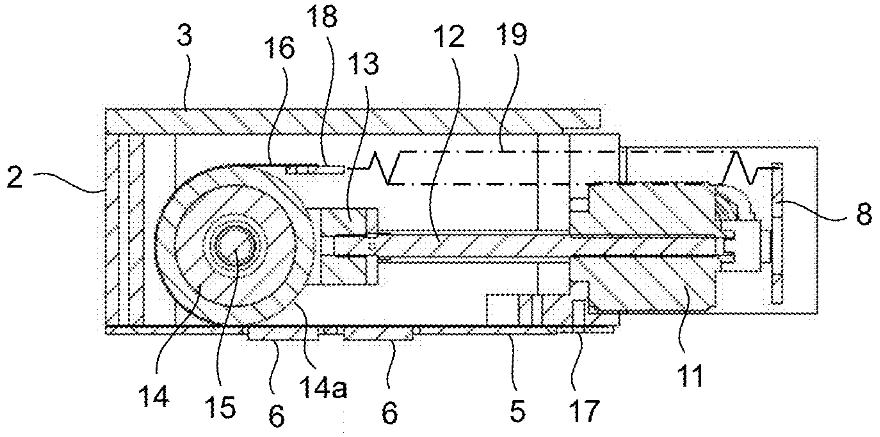
FIG. 2 is (i-1) an explanatory cross-sectional view (cross-section A-A of FIG. 1) of the workpiece holding device X1 in a state in which a rod of an extension device is extended to push out a movement roller.
Figure 3:
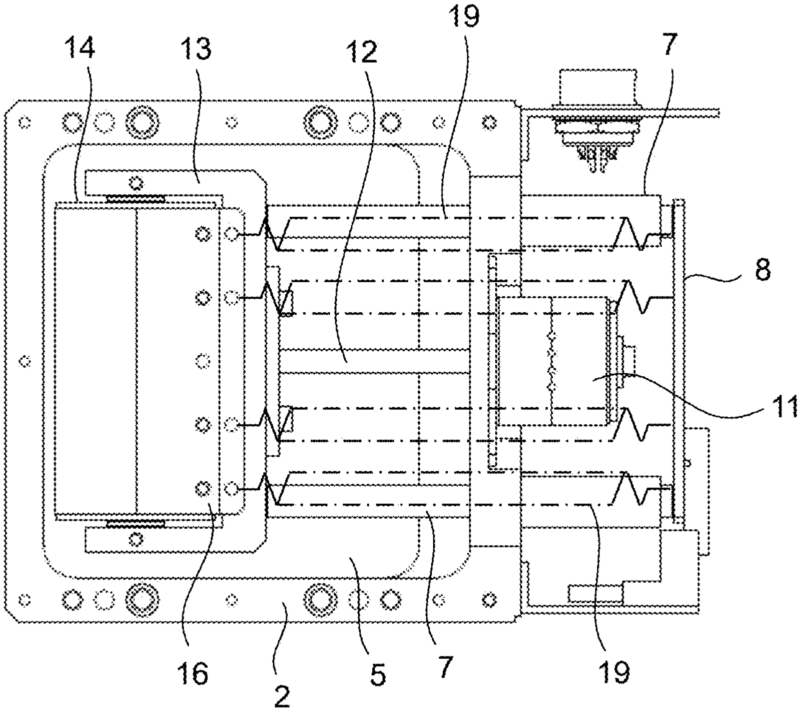
FIG. 3 is an explanatory plan view showing an inside of a storage chamber with a lid body of a box-shaped housing removed in the state of FIG. 2.

Here, as shown in a cross-sectional view (A-A cross-section of FIG. 1) of FIG. 2 and a plan view (top view of the box-shaped housing 4 with the lid body 3 removed) of FIG. 3, the extension device 1 in the workpiece holding device X1 is formed with a screw (rod) 12 incorporated into a stepping motor 11, and a movement roller 14 is attached at a tip end of the screw 12 via a roller mounting jig 13. The roller mounting jig 13 includes a roller shaft 15 so that the movement roller 14 is rotatable.

Further, in this example, a first strip-like base material 16 wound around a roll surface 14*a* of the movement roller 14 is formed of a PET film having 48 mm in width×111 mm in length×25 μm in thickness, and one end of the first strip-like base material 16 is secured on a lower opening side of the housing main body 2 by means of a screw 17 via a plate member. Meanwhile, a tension spring 19 is connected to the other end of the first strip-like base material 16 via a plate member 18, and the other end of the tension spring 19 is attached to the support plate 8.

Figure 4:
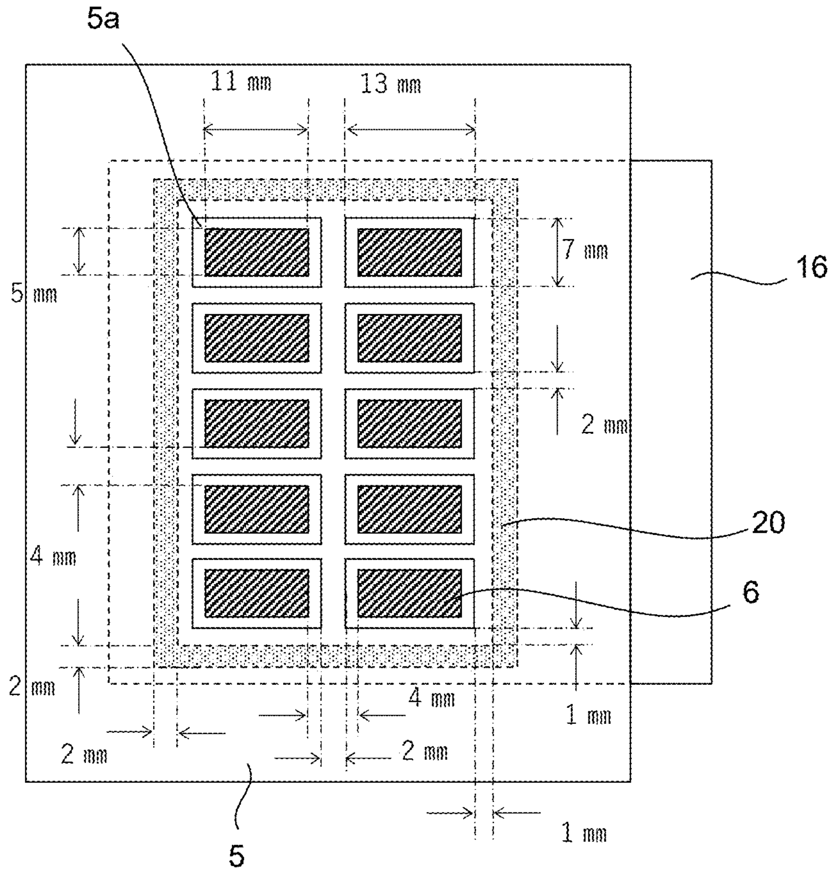
FIG. 4 shows a state of an adhesive holding material of a first strip-like base material forming an adhesive holding surface, in relation to an opening hole of a load receiving plate.

In addition, the adhesive holding materials 6, each having 5 mm in width×11 mm in length×2 mm in thickness, are attached using an acrylic adhesive to the PET film that forms the first strip-like base material 16 such that five adhesive holding materials 6 in each of two rows, ten in total, are arranged with a gap of 4 mm between the rows, thereby forming the adhesive holding part. Further, the load receiving plate 5 is provided with the opening holes 5*a*, each having 7 mm in width×13 mm in length, in two rows, each row having five of the opening holes 5*a*, so as to correspond to the adhesive holding part. In addition, an adhesive member 20 having a thickness of 100 μm shaped in a window frame having a width of 2 mm is attached to the load receiving plate 5 using an acrylic adhesive so as to surround the opening holes 5*a*. Here, FIG. 4 shows a state of the adhesive holding material 6 of the first strip-like base material 16 forming the adhesive holding surface, in relation to the opening hole 5*a* of the load receiving plate 5.

Figure 7A:
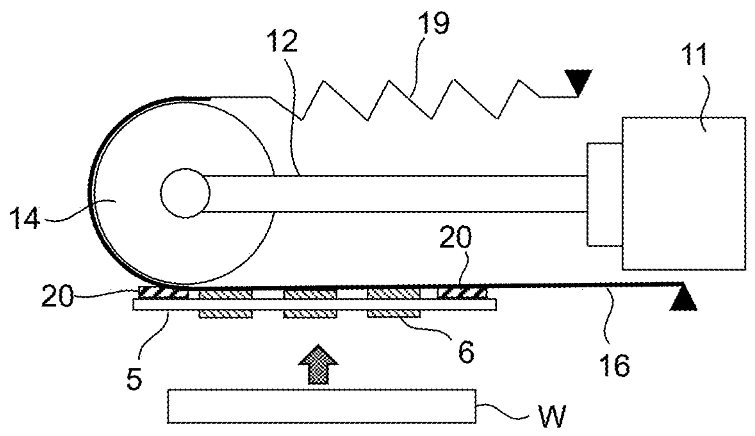
FIG. 7(*a*) is (i-1) a schematic explanatory view showing a state in which the adhesive holding part of the strip-like base material is made to be a flat adhesive holding surface.
Figure 7B:
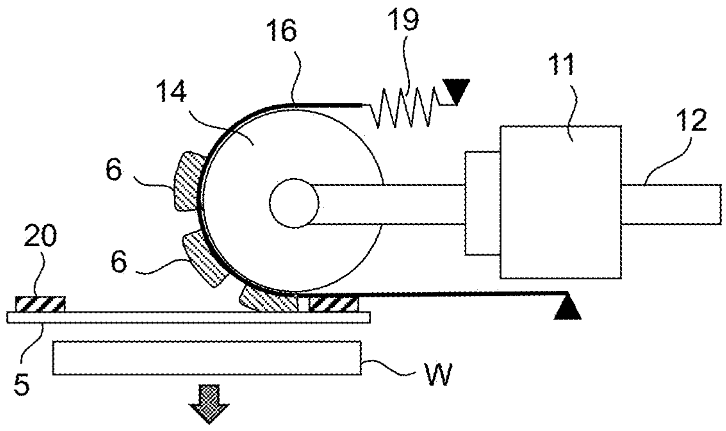

Regarding the workpiece holding device X1, FIGS. 2 and 3 above show (i-1) a state in which the screw 12 incorporated in the stepping motor 11 forming the extension device is extended to push forward the movement roller 14. With such a state, the first strip-like base material 16 is extended on the lower side of the housing main body 2, and the adhesive holding material 6 forming the adhesive holding part of the first strip-like base material 16 parallel to the direction in which the movement roller 14 is pushed out forms a flat adhesive holding surface. FIG. 7(*a*) schematically shows this state in which the adhesive holding material 6 projects through the opening hole 5*a* of the load receiving plate 5 to come into contact with a workpiece W, thereby enabling an upper surface of the workpiece W to be held by the adhesive holding material 6 forming the adhesive holding surface. Further, when the workpiece W is actually held, since the load receiving plate 5 made of stainless steel is present, the first strip-like base material 16 made of a PET film can be prevented from bending due to the own weight of the workpiece W. Furthermore, with the adhesive member 20 interposed between the load receiving plate 5 and the first strip-like base material 16, movement or deformation of the first strip-like base material 16 can be surely suppressed even when the workpiece W is transported or the like while being held. In particular, when the workpiece holding device X1 is tilted from the vertical direction, since a force other than that in the vertical direction acts on the first strip-like base material 16, movement or deformation of the first strip-like base material 16 can be surely suppressed.

Figure 5:
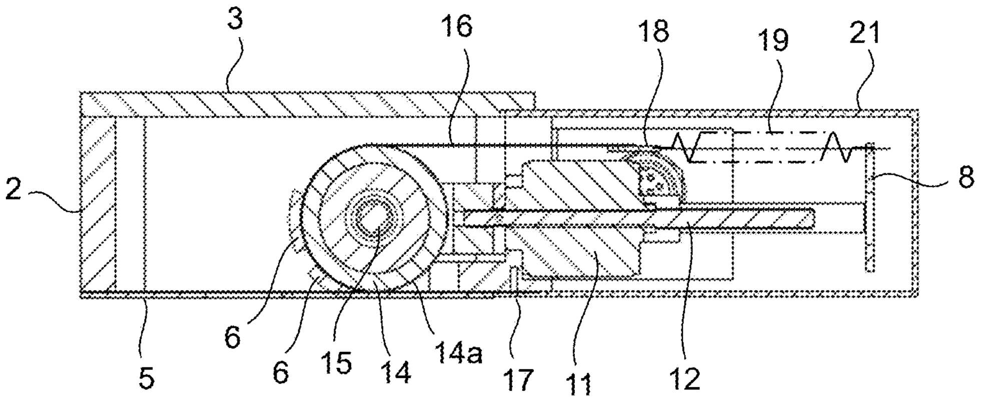
FIG. 5 is (ii-1) an explanatory cross-sectional view (cross-section A-A of FIG. 1) of the workpiece holding device X1 in a state in which the rod of the extension device is contracted to retract the movement roller.
Figure 6:
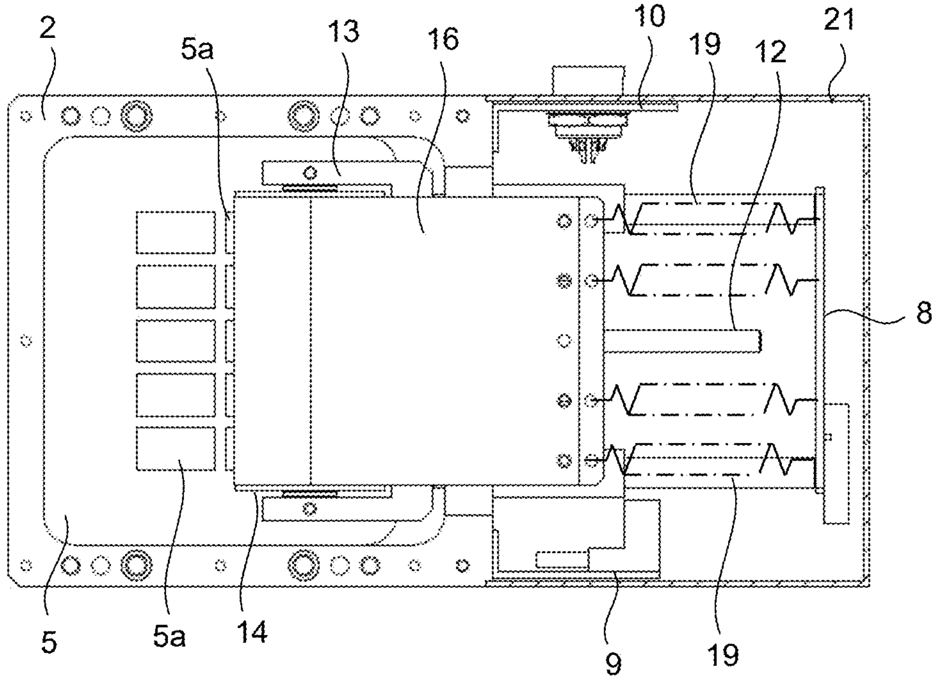
FIG. 6 is an explanatory plan view showing the inside of the storage chamber with the lid body of the box-shaped housing removed in the state of FIG. 5.

Meanwhile, the cross-sectional view of FIG. 5 (the same as in the case of FIG. 2) and the plan view of FIG. 6 (the same as in the case of FIG. 3) show (ii-1) a state in which the screw 12 incorporated into the stepping motor 11 forming the extension device is contracted so that the movement roller 14 is retracted rearward to be at a steady position. With such a state, the adhesive holding material 6 forming the adhesive holding part of the first strip-like base material 16 curves along the roll surface 14*a* of the movement roller 14, so that the adhesive holding material 6 no longer projects through the opening hole 5*a* of the load receiving plate 5 and is released from contact with the workpiece, thereby causing the workpiece W adhesively held in the state of (i-1) to be peeled off from the adhesive holding part. FIG. 7(*b*) schematically shows this state. As can be understood from this, when the adhesive holding material 6 curves along the roll surface 14*a* of the movement roller 14, with the load receiving plate 5 present between the adhesive holding material 6 and the workpiece W, it is also possible to separate the workpiece W without applying an external force to the workpiece W or to peel off (separate) the workpiece W such that the workpiece W drops due to its own weight. Note that FIG. 5 and FIG. 6 show a state in which a cover member 21 is attached to a portion of the workpiece holding device X1.

[Workpiece Holding Device X2 According to Second Embodiment]

Figure 8:
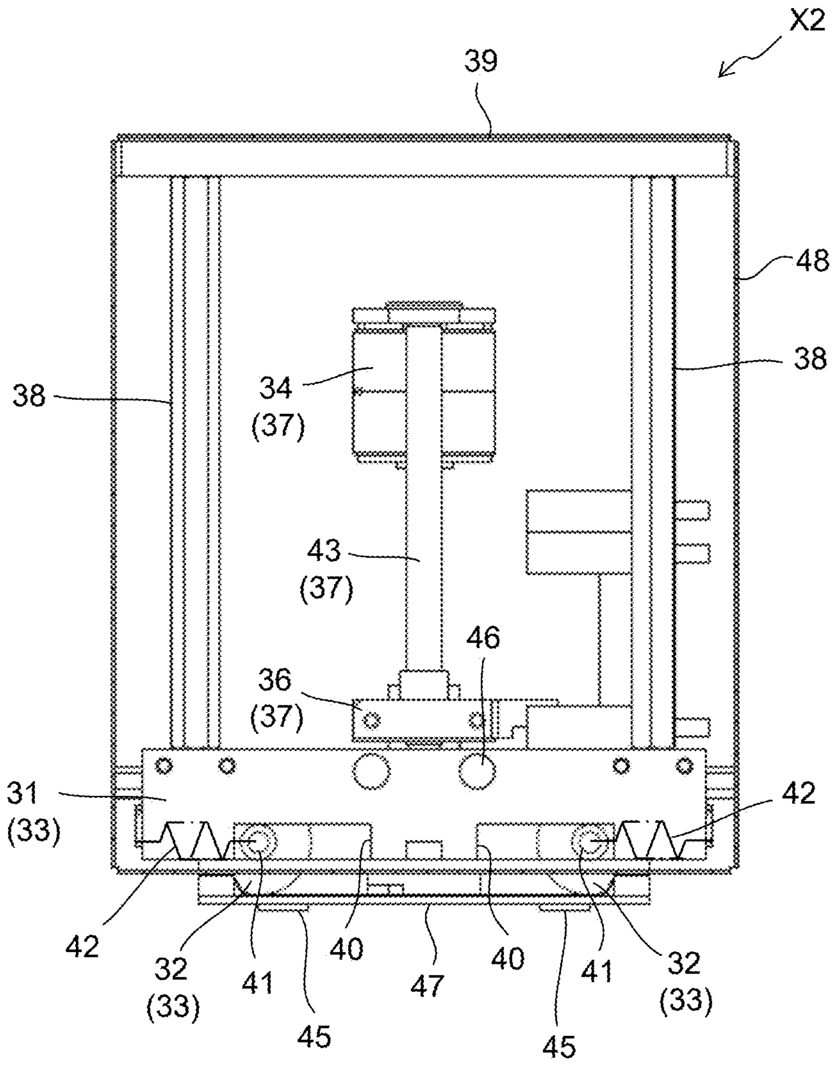
FIG. 8 is (i-2) an explanatory front view of a workpiece holding device X2 in a state in which two movement rollers of a movement roller device are spaced apart from each other.
Figure 9:
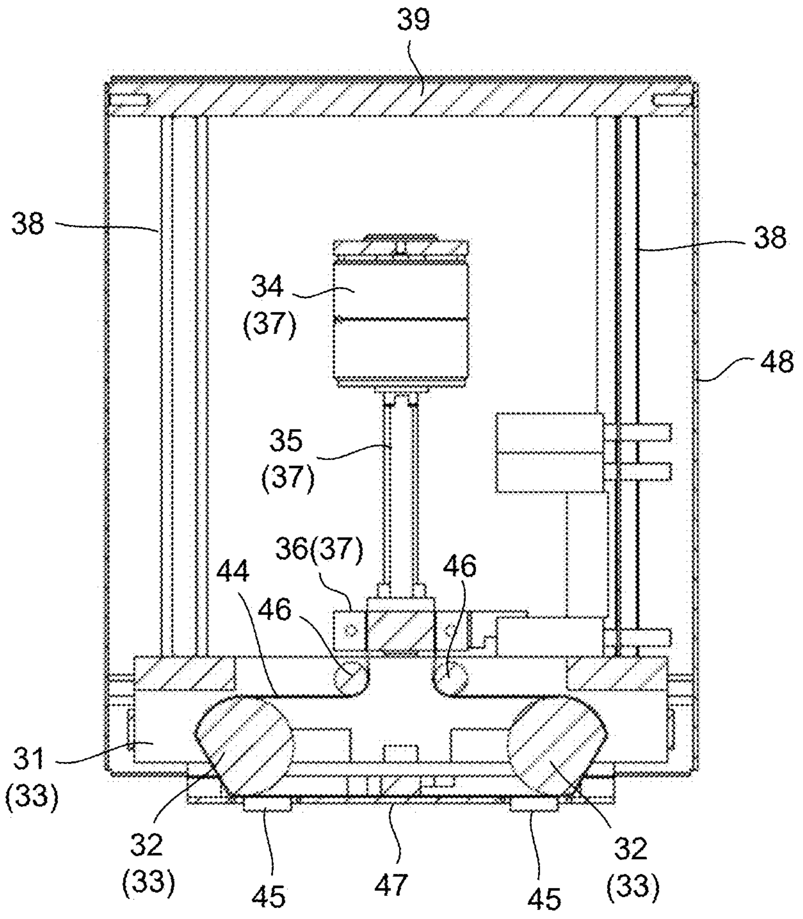
FIG. 9 is an explanatory longitudinal cross-sectional view of the workpiece holding device X2 in the state of FIG. 8.

Next, regarding a workpiece holding device according to a second embodiment, FIG. 8 and FIG. 9 show a workpiece holding device X2 as an example. FIG. 8 is a front view as seen from the front, and FIG. 9 is a longitudinal cross-sectional view. The workpiece holding device X2 includes a movement roller device 33 with two movement rollers 32 within a frame body 31 and a lifting device 37 with a fixing jig 36 that can be raised and lowered along a screw (lifting axis) 35 incorporated into a stepping motor 34, through extension and contraction of the screw 35. Further, at four corners of the frame body 31 in the movement roller device 33, four metal supports 38 are provided upright with a ceiling plate 39 attached on their tip end side.

Here, regarding the movement roller device 33, the frame body 31 has a guide rail 40 along which roller shafts 41 of the movement rollers 32 can perform parallel movement. Further, tension springs 42 are attached to both ends of the roller shafts 41 of the movement rollers 32, and the other end of each tension spring 42 is connected to an end of the frame body 31. In this manner, the two movement rollers 32 are spaced apart from each other within the frame body 31. Furthermore, the lifting device 36 is installed at a center of the movement roller device 33, and two linear guides 43 are provided in parallel with the screw 35, assisting raising and lowering of the fixing jig 36.

In addition, a flexible second strip-like base material 44 formed of a PET film having 49 mm in width×149 mm in length×25 μm in thickness is wound around the movement rollers 32 of the movement roller device 33, and both ends of the second strip-like base material 44 are fixed at the fixing jig 36 of the lifting device 37 via a guide roll 46. The second strip-like base material 44 formed of this PET film has two adhesive holding parts, to each of which an adhesive holding material 45 that is self-adhesive having a thickness of 2 mm is attached, and a lower portion of the frame body 31 is closed by a load receiving plate 47 made of stainless steel with a thickness of 1 mm having an opening hole so as to expose the adhesive holding material 45 of the second strip-like base material 44. In FIG. 8 and FIG. 9, the fixing jig 36 of the lifting device 37 is lowered and the movement rollers 32 are in steady positions where the movement rollers 32 are spaced apart from each other, thus forming, between the movement rollers 32, an adhesive holding surface where the adhesive holding materials 45 in the two adhesive holding parts are flush with each other. Note that the workpiece holding device X2 can be covered by a cover member 48.

Figure 10:
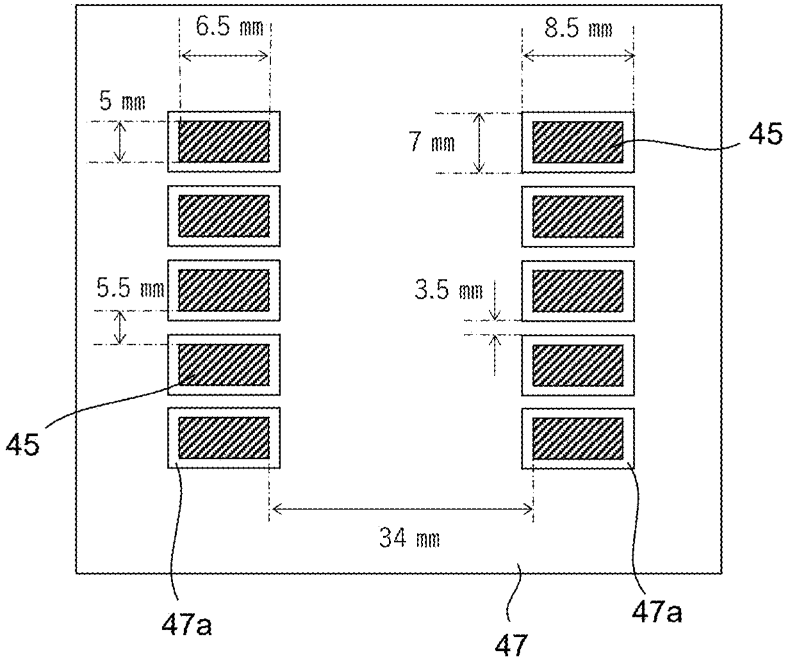
FIG. 10 shows a state of an adhesive holding material of a second strip-like base material forming an adhesive holding surface, in relation to an opening hole of a load receiving plate.

FIG. 10 shows a state of the adhesive holding material 45 of the second strip-like base material 44 forming the adhesive holding surface, in relation to an opening hole 47*a* of the load receiving plate 47. More specifically, the PET film forming the second strip-like base material 44 is provided with two adhesive holding parts arranged in parallel with a distance of 34 mm from each other, and the adhesive holding materials 45, each having 5 mm in width×6.5 mm in length×2 mm in thickness, are attached to each adhesive holding part using an acrylic adhesive such that five of those are arranged in an up-down direction with a gap of 5.5 mm between each other. Further, the load receiving plate 47 is provided with the opening holes 47*a*, each having 7 mm in width×8.5 mm in length, such that five of those are arranged so as to correspond to each of the adhesive holding parts.

Figure 13A:
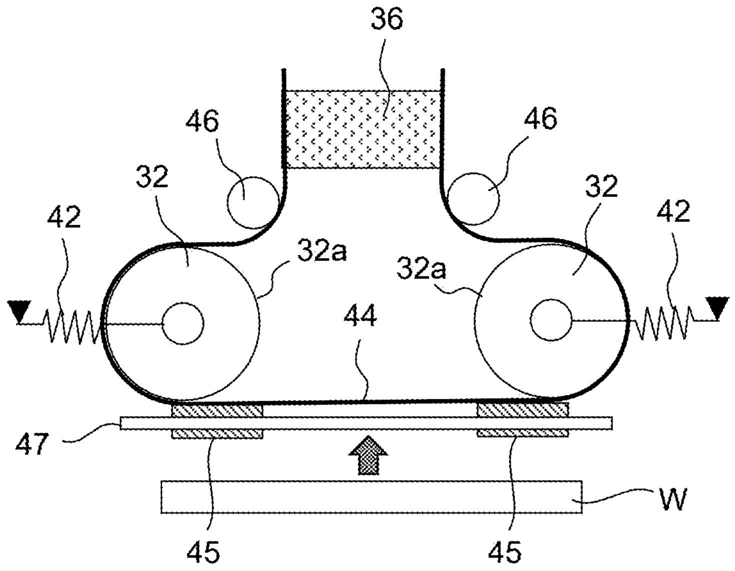
FIG. 13(*a*) is (i-2) a schematic explanatory view showing a state in which the two movement rollers of the movement roller device are spaced apart from each other, and FIG. 13(*b*) is (ii-2) a schematic explanatory view showing a state in which a fixing jig of a lifting device is raised to bring the two movement rollers of the movement roller device closer to each other.
Figure 13B:
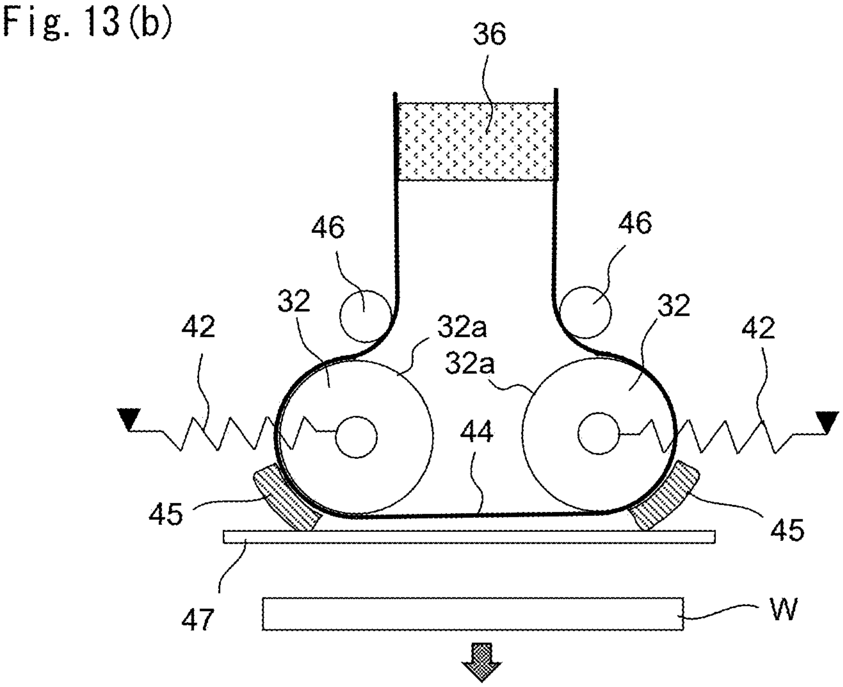

Regarding the workpiece holding device X2, FIG. 8 and FIG. 9 above show (i-2) a state in which the two movement rollers 32 of the movement roller device 33 are spaced apart from each other and the fixing jig 36 of the lifting device 37 is lowered to form an adhesive holding surface where the two adhesive holding parts of the second strip-like base material 44 are flush with each other, so that the workpiece W is contacted to be able to be held. FIG. 13(*a*) schematically shows this state in which the upper surface of the workpiece W can be held by the adhesive holding materials 45 forming the adhesive holding surface. Further, when the workpiece W is actually held, since the load receiving plate 47 made of stainless steel is present, the second strip-like base material 44 made of a PET film can be prevented from bending due to the own weight of the workpiece W.

Figure 11:
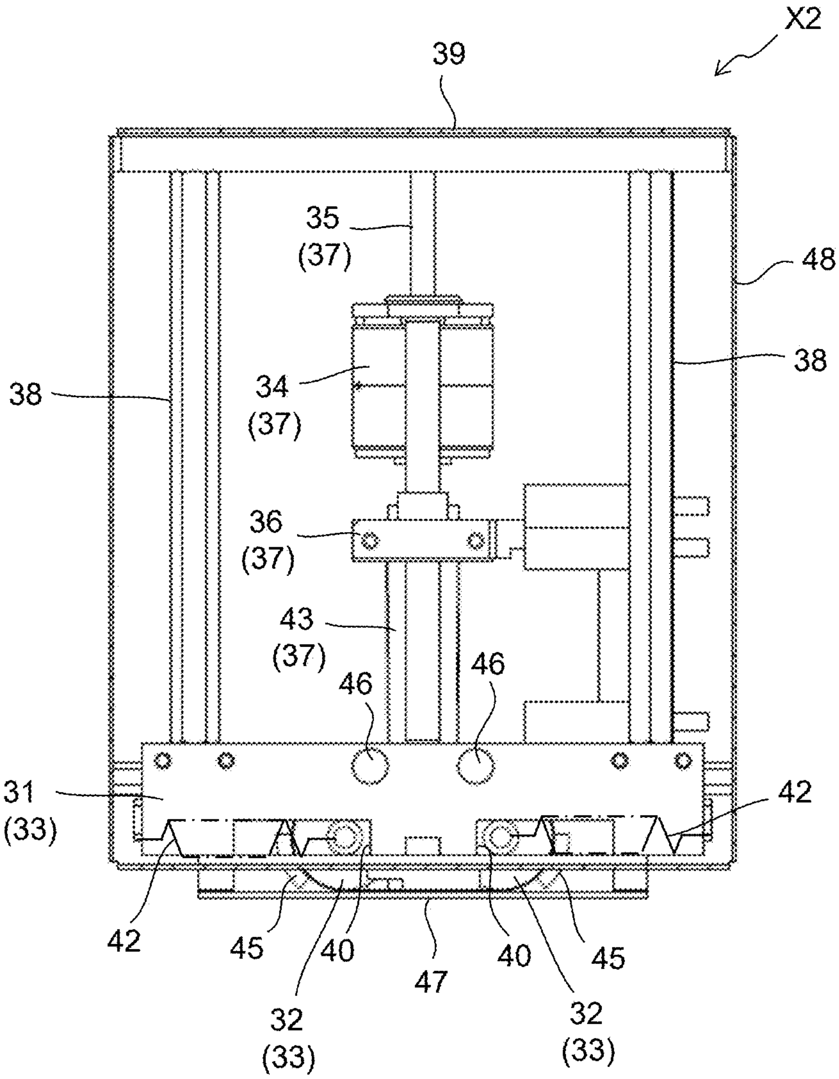
FIG. 11 is (ii-2) an explanatory front view of the workpiece holding device X2 in a state in which the two movement rollers of the movement roller device are brought closer to each other.
Figure 12:
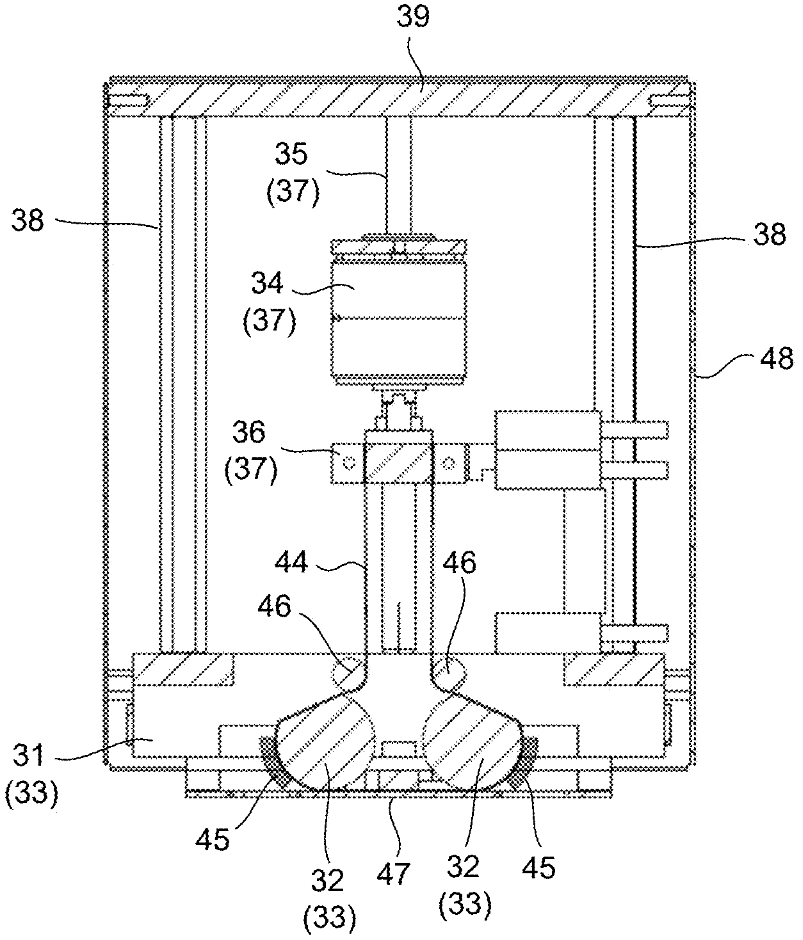
FIG. 12 is an explanatory longitudinal cross-sectional view of the workpiece holding device X2 in the state of FIG. 11.

Meanwhile, the front view of FIG. 11 and the longitudinal cross-sectional view of FIG. 12 show (ii-2) a state in which the fixing jig 36 of the lifting device 37 is raised along the lifting axis, to bring the two movement rollers 32 of the movement roller device 33 closer to each other. In this manner, the adhesive holding materials 45 forming the two adhesive holding parts of the second strip-like base material 44 curve along the roll surfaces 32*a* of the movement rollers 32 and are released from contact with the workpiece, thereby causing the workpiece W adhesively held in the state of (i-2) to be peeled off from the adhesive holding parts. FIG. 13(*b*) schematically shows this state. As can be understood from this, when the adhesive holding materials 45 curve along the roll surfaces 32*a* of the movement rollers 32, with the load receiving plate 47 present between the adhesive holding materials 45 and the workpiece W, it is also possible to separate the workpiece W without applying an external force to the workpiece W or to peel off (separate) the workpiece W such that the workpiece W drops due to its own weight.

EXAMPLE

The following evaluation test was conducted by attaching the workpiece holding device X1 according to the first embodiment described above to an articulated robot that can move up and down. Note that the workpiece holding device X1 was (i-1) in a state in which the screw 12 incorporated into the stepping motor 11 is extended to push the movement roller 14 forward to cause the adhesive holding part of the first strip-like base material 16 to form a flat adhesive holding surface so as to allow the adhesive holding material 6 to project through the opening hole 5*a* of the load receiving plate 5.

First, an acrylic block (50 mm×130 mm×16 mm in height: workpiece W1) weighing 122 g was placed on a mount base, and the workpiece holding device X1 was lowered from above in the vertical direction to press the adhesive holding surface against the workpiece W1. Then, the workpiece W1 was lifted upward in the vertical direction and left while being lifted for five minutes, and whether the workpiece W1 has dropped was checked. In place of the workpiece W1, a glass plate (70 mm×125 mm×8 mm in height: workpiece W2) weighing 174 g and an aluminum block (97 mm×140 mm×10 mm in height: workpiece W3) weighing 380 g with a polyimide film attached to its surface were similarly checked as to whether the workpieces have dropped. Further, for comparison and reference, the load receiving plate 5 of the workpiece holding device X1 was removed and the above evaluation test was conducted on the workpieces W1 to W3. The results are shown in Table 1.

TABLE 1

| | Load receiving plate | |
|---|---|---|
| Weight of workpiece | Present (Example) | None (Comparative Example) |
| 122 g (Workpiece W1) | ○ No dropping | ○ No dropping |
| 174 g (Workpiece W2) | ○ No dropping | x Dropped |
| 380 g (Workpiece W3) | ○ No dropping | x Failed to lift |

As shown in Table 1, in the workpiece holding device for comparison and reference, with the load receiving plate 5 removed, the lightest workpiece W1 was able to be adhesively held for five minutes, but the workpiece W2 dropped halfway through, and the workpiece W3 was able to be raised by adhesively holding it on the adhesive holding surface, but failed to be lifted from the mount base. By contrast, the workpiece holding device X1 according to the present invention was able to lift and adhesively hold all the workpieces W1 to W3 even without dropping them halfway through.

As described above, according to the present invention, a workpiece can be held with sufficient adhesive force, and the held workpiece can be separated without applying any load to it. Moreover, the workpiece holding device of the present invention adhesively holds the workpiece using the van der Waals force on the surface and is thus versatile for any type or shape of the workpiece, and is applicable to a wide range of applications, for example, for use as a workpiece transporting device that transports various types of workpieces, as part of a robot hand that picks up workpieces, or for fixing workpieces.

REFERENCE SIGNS LIST

1 extension device
2 housing main body
3 lid body
4 box-shaped housing
5 load receiving plate
6 adhesive holding material
7 ball guide
8 support plate
9 mounting jig
10 mounting bracket
11 stepping motor
12 ball screw
13 roller mounting jig
14 movement roller
15 roller shaft
16 first strip-like base material
17 screw
18 plate member
19 tension spring
20 adhesive member
21 cover member
31 frame body
32 movement roller
33 movement roller device
34 linear motor
35 ball screw
36 fixing jig
37 lifting device
38 metal support
39 ceiling plate
40 guide rail
41 roller shaft
42 tension spring
43 linear guide
44 second strip-like base material
45 adhesive holding material
46 guide roll
47 load receiving plate
48 cover member

The invention claimed is:

1. A workpiece holding device using an adhesive holding material that is self-adhesive, the workpiece holding device comprising:

a flexible base material including an adhesive holding part to which the adhesive holding material is attached;

a movement roller including a roll surface; and a load receiving plate that supports from below at least a portion of the flexible base material that holds a workpiece on the adhesive holding part, wherein the flexible base material is wound around the roll surface of the movement roller with the adhesive holding part facing outward, operation of the movement roller (I) makes the adhesive holding part of the flexible base material an adhesive holding surface that is flat so as to enable the workpiece to be held and (II) curves the adhesive holding part of the flexible base material along the roll surface of the movement roller so as to enable the workpiece to be peeled off, and when the workpiece is held on the adhesive holding surface, bending of the flexible base material due to a weight of the workpiece is prevented by means of the load receiving plate.

2. The workpiece holding device according to claim 1, wherein an adhesive member having adhesiveness is interposed between the load receiving plate and the flexible base material.

3. The workpiece holding device according to claim 1, comprising:

the flexible base material;

the load receiving plate;

an extension device including an extendable rod having, at a tip end of the rod, the movement roller including the roll surface; and a box-shaped housing including a storage chamber in which the flexible base material and the extension device are housed, a lower portion of the box-shaped housing being opened, wherein the flexible base material is wound around the roll surface of the movement roller in the extension device with the adhesive holding part facing outward, with one end of the flexible base material being fixed and with another end of the flexible base material being tensibly attached via a tensile elastic member, (i-1) the rod of the extension device is extended to push out the movement roller, thereby making the adhesive holding part of the flexible base material the adhesive holding surface that is flat so as to enable the workpiece to be held, (ii-1) the rod of the extension device is contracted to retract the movement roller, thereby curving the adhesive holding part of the flexible base material along the roll surface of the movement roller so as to enable the workpiece to be peeled off, and the load receiving plate includes an opening hole for exposing the adhesive holding material when the workpiece is held by the adhesive holding part of the flexible base material and closes a lower portion of the box-shaped housing.

4. The workpiece holding device according to claim 3, wherein an adhesive member having adhesiveness is interposed between the load receiving plate and the flexible base material.

5. The workpiece holding device according to claim 1, comprising:

a flexible second base material including at least two of the adhesive holding parts, to each of which the adhesive holding material is attached;

a movement roller device including two of the movement rollers, the movement rollers having roll surfaces and roller shafts that are capable of parallel movement within a frame body having a guide rail, the roller shafts being supported at both ends of the frame body via tensile elastic members such that the movement rollers are spaced apart from each other within the frame body;

a lifting device that is provided upright in the movement roller device, the lifting device having a fixing jig that can be raised and lowered along a lifting axis; and the load receiving plate, wherein the flexible second base material is wound around the roll surfaces of the two movement rollers of the movement roller device with the adhesive holding parts facing outward, with both ends of the flexible second base material each being fixed to the fixing jig of the lifting device, (i-2) with the two movement rollers of the movement roller device spaced apart from each other, the adhesive holding surface where the two adhesive holding parts are flush with each other is formed so as to enable the workpiece to be held, (ii-2) by raising the fixing jig of the lifting device along the lifting axis, the two movement rollers of the movement roller device are brought closer to each other to curve the two adhesive holding parts along the respective roll surfaces of the movement rollers so as to enable the workpiece to be peeled off, and the load receiving plate includes the opening hole for exposing the adhesive holding material when the workpiece is held by the two adhesive holding parts of the flexible second base material and closes the lower portion of the frame body.

6. The workpiece holding device according to claim 5, wherein an adhesive member having adhesiveness is interposed between the load receiving plate and the flexible second base material.

* * * * *